United States Patent
Miller et al.

(10) Patent No.: US 6,765,937 B1
(45) Date of Patent: Jul. 20, 2004

(54) APPARATUS AND METHOD FOR ANALYSIS AND CONTROL OF TIMING OF A TRAIN OF HIGH SPEED, HIGH POWER LASER PULSES

(75) Inventors: Kevin L Miller, Loveland, CO (US); D Mitchel Hanks, Fort Collins, CO (US); Kevin L Colburn, Greeley, CO (US); Charles R Weirauch, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/493,432

(22) Filed: Jan. 29, 2000

(51) Int. Cl.[7] .............................. H01S 3/10; H01S 3/13; H01S 3/00

(52) U.S. Cl. ........................ 372/30; 372/24; 372/29.01; 372/29.02; 372/38.07; 372/31

(58) Field of Search ........................ 372/24, 25, 29.01, 372/29.02, 29.014, 29.015, 30, 31, 38.07; 369/54, 58, 44.25, 44.27

(56) References Cited

U.S. PATENT DOCUMENTS

| | | | | | |
|---|---|---|---|---|---|
| 4,831,611 A | * | 5/1989 | Sasaki et al. | ............. | 369/53.31 |
| 5,524,103 A | * | 6/1996 | Shimizu et al. | ................ | 369/59 |
| 5,608,712 A | * | 3/1997 | Rilum et al. | ................ | 369/116 |
| 5,790,491 A | * | 8/1998 | Jaquette et al. | ........... | 369/47.53 |
| 6,246,646 B1 | * | 6/2001 | Abe et al. | ................ | 369/44.27 |

OTHER PUBLICATIONS

European Computer Manufacturers Association (ECMA) Standard ECMA–279 80 mm (1,23 Gbytes per side) and 120 mm (3,95 Gbytes per side) DVD–Recordable Disk (DVD–R), Dec. 1998: Basic Write Strategy p. 21 section 4.3.

European Computer Manufacturers Association (ECMA) Standard ECMA–279 80 mm (1,23 Gbytes per side) and 120 mm (3,95 Gbytes per side) DVD–Recordable Disk (DVD–R), Dec. 1998: Variation of the Write Strategy p. 103 Annex P.

* cited by examiner

*Primary Examiner*—Don Wong
*Assistant Examiner*—Armando Rodriguez
(74) *Attorney, Agent, or Firm*—Jack A. Lenell

(57) ABSTRACT

An apparatus and method for flexibly and precisely varying temporal placement and duration of pulses, within a train of high speed, high power optical pulses. The invention includes optics adapted for focusing on a layer of an information storage media. An optical pulse generator is coupled with the layer through the optics for generating a train of optical pulses, wherein each pulse has a respective temporal placement within the train and has a respective pulse duration. The respective pulse duration of each pulse is controlled by an amount of an analog duration control voltage, in accordance with a WRITE STRATEGY, which is based on a physical property of the layer of the information storage media. Similarly the respective temporal placement of each pulse is controlled by an amount of an analog temporal placement control voltage, in accordance with the WRITE STRATEGY.

15 Claims, 4 Drawing Sheets

APPARATUS AND METHOD FOR ANALYSIS AND CONTROL OF TIMING OF A TRAIN OF HIGH SPEED, HIGH POWER LASER PULSES

FIELD OF THE INVENTION

The invention generally relates to electro-optics, and more specifically relates to analysis and control of timing of trains of high speed optical pulses.

BACKGROUND OF THE INVENTION

Initially, trains of high speed, high power laser pulses could only be generated by specially trained technicians utilizing a room full of complex and specialized laboratory equipment. Especially challenging is precise control of timing attributes, such as temporal placement and duration of each pulse of the train.

It may be possible to monitor temporal placement and duration of each pulse of such trains of high speed, high power laser pulses using previously known arrangements, such as extremely high speed sample and hold circuits. Additionally, it may be possible to precisely control such timing attributes of optical pulses using microwave frequency clock signals. While these arrangements provide some advantages, they are typically relatively complex, expensive, and difficult to manufacture, use and maintain.

Today, because of mass production and mass merchandising of consumer electronic devices such as readable/re-writeable Compact Disc (CD) drives, Digital Versatile Disc (DVD) drives and the like, ordinary people can generate a train of high speed, high power laser pulses within an area less then five and one quarter inches wide (of course, most such people are unaware that they are doing so.)

Write operations typically require that write pulses within the pulse train last for only approximately sixteen to approximately eight nanoseconds or less. It is desirable to vary temporal placement and duration of pulses in accordance a so called "WRITE STRATEGY", which is based in part on physical properties, for example thermodynamic properties, of a layer of disc media that interacts with the laser pulse train.

Examples of various respective "WRITE STRATEGIES" are specified in the European Computer Manufacturers Association (ECMA) Standard ECMA-279 80 mm (1,23 Gbytes per side) and 120 mm (3,95 Gbytes per side) DVD-Recordable Disk (DVD-R), December 1998: BASIC WRITE STRATEGY page 21 section 4.3; and VARIATION OF THE WRITE STRATEGY page 103 Annex P.

Many vendors of consumer electronic devices implement a WRITE STRATEGY by varying temporal placement and duration of optical pulses using a primarily digital method, which is limited by relatively small integral numbers of relatively low frequency clock pulses. For example: a five hundred megahertz (500 Mhz) frequency electronic clock is employed; flexibility and precision of temporal placement is limited to integral multiples of two nanoseconds (one clock cycle); six consecutive electrical pulses of the clock are used to provide a twelve nanosecond duration optical pulse; four consecutive electrical pulses of the clock are used to provide an eight nanosecond duration optical pulse; and seven consecutive electrical pulses of the clock are used to provide a fourteen nanosecond duration optical pulse. Accordingly, in this example flexibility and precision of the implementation of the WRITE STRATEGY is limited to optical pulses having durations of twelve, eight, or fourteen nanoseconds.

Of course, precision of implementations of the WRITE STRATEGY using the primarily digital method could be improved by using relatively larger number of relatively higher, microwave frequency clock pulses. However, this would add undesired complexity expense, and difficulty in manufacturing, use and maintenance of consumer electronic devices.

What is needed for consumer electronic devices is a relatively simple (and relatively easy to manufacture, use and maintain) apparatus and method for flexibly and precisely varying temporal placement and duration of pulses, within a train of high speed, high power optical pulses.

SUMMARY OF THE INVENTION

The invention provides a relatively simple (and relatively easy to manufacture, use and maintain) apparatus and method for flexibly and precisely varying temporal placement and duration of pulses, within a train of high speed, high power optical pulses. These aspects of the invention make it particularly advantageous for use in consumer electronics devices such as readable/re-writeable Compact Disc (CD) drives, Digital Versatile Disc (DVD) drives and the like.

Briefly and in general terms the invention includes optics adapted for focusing on a layer of an information storage media. An optical pulse generator is coupled with the layer through the optics for generating a train of optical pulses, wherein each pulse has a respective temporal placement within the train and has a respective pulse duration. The respective pulse duration of each pulse is controlled by an amount of an analog duration control voltage, in accordance with a WRITE STRATEGY, which is based on a physical property of the layer of the information storage media. Similarly the respective temporal placement of each pulse is controlled by an amount of an analog temporal placement control voltage, in accordance with the WRITE STRATEGY.

Other aspects and advantages of the present invention will become apparent from the following detailed description, taken in conjunction with the accompanying drawings, illustrating by way of example the principles of the invention.

DETAILED DESCRIPTION OF PREFERRED EMBODIMENT

Figure 1:
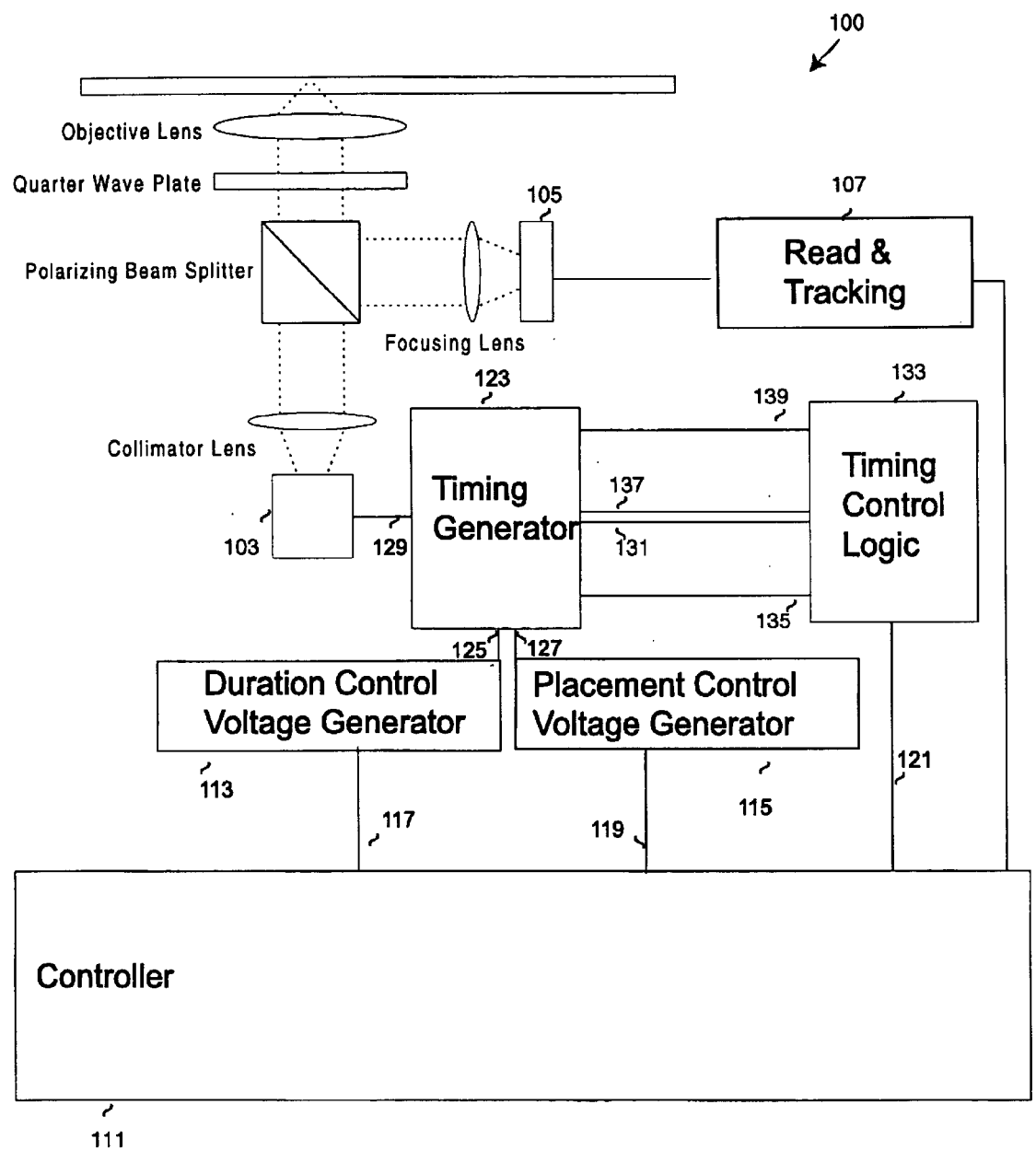
FIG. 1 is a simplified block diagram illustrating a preferred embodiment of the invention.

FIG. 1 is a simplified block diagram illustrating a preferred embodiment of the invention 100. As shown the invention includes an optical pulse generator, preferably a solid state LASER and Driver 103 for generating a train of optical pulses, wherein the optical pulse generator provides a high optical intensity level and a low optical intensity level. Preferably, the Driver is a model 6257 current source driver model made by Elantec and the LASER is a 660 nanometer LD9451 MB LASER diode made by Toshiba.

Preferably, the optical pulse generator employed in the invention is adapted for use in consumer electronic devices such as readable/re-writeable Compact Disc (CD) drives, Digital Versatile Disc (DVD) drives and the like. In the preferred embodiment, a minimal bias of the solid state LASER 103 provides only minimal output for example one half of a milliwatt or less as the low optical intensity level. The high optical intensity level of the pulses is approximately six to approximately one hundred milliwatts or more.

FIG. 1 shows optics adapted for focusing on a layer of an information storage media. Optical beam paths are representatively illustrated in FIG. 1 by stippled lines. As shown, for both read and write optical operations, in the preferred embodiment the optical beam path extends from the LASER 103 through a collimator lens, then through a polarizing beam splitter, then through a quarter wave plate, then through a focusing objective lens, to the layer of the information storage media, preferably a rotating disk media.

For read operations, upon optically interacting with the layer of the information media, the LASER beam reverses direction and retraces the optical beam path through the objective lens, through the quarter wave plate, and into the polarizing beam splitter. The polarizing beam splitter then directs most of the optical energy of the LASER beam through a focusing lens to a photodiode 105, for example a high speed photodiode such as the PIN-020A made by UDT Sensors Inc. In the block diagram, the stippled lines representatively illustrates such optical coupling between the photodetector 105 and the optical pulse generator 103.

As shown in FIG. 1, read and tracking electronics 107 are electrically coupled with an output of the photodetector 105 for retrieving information stored in the layer of the information storage media and monitoring tracking and focus. A controller 111, is preferably embodied in a suitable programmed microprocessor, digital signal processor, or as a state machine or as an arrangement of gates and registers in an application specific integrated circuit (ASIC). The controller 111 is electrically coupled with the read and tracking electronics for processing the information and servo control functions of tracking and focus.

For write pulses, the optical pulse generator is coupled with the layer through the optics, for generating the train of optical pulses, wherein each pulse has a respective temporal placement within the train and has a respective pulse duration. Write operations typically require that write pulses within the pulse train last for only approximately sixteen to approximately eight nanoseconds or less. It is desirable to vary temporal placement and duration of pulses in accordance a so called "WRITE STRATEGY", which is based in part on physical properties, for example thermodynamic properties, of a layer of disc media that interacts with the laser pulse train.

Examples of various respective "WRITE STRATEGIES" are specified in the European Computer Manufacturers Association (ECMA) Standard ECMA-279 80 mm (1,23 Gbytes per side) and 120 mm (3,95 Gbytes per side) DVD-Recordable Disk (DVD-R), December 1998: BASIC WRITE STRATEGY page 21 section 4.3; and VARIATION OF THE WRITE STRATEGY page 103 Annex P.

The respective pulse duration of each pulse is controlled by an amount of an analog duration control voltage provided by a corresponding generator 113, in accordance with a WRITE STRATEGY, which is based on a physical property of the layer of the information storage media. Similarly the respective temporal placement of each pulse is controlled by an amount of an analog temporal placement control voltage provided by a corresponding generator 115, in accordance with the WRITE STRATEGY.

In the preferred embodiment, the controller 111 is coupled the generators 113, 115 for variably controlling the respective voltage amounts of the analog duration control voltage and the analog temporal placement control voltage, and In turn the respective duration and temporal placement of the optical pulses, in accordance with the WRITE STRATEGY that is based on the physical property of the layer of the information storage media. Preferably, the generators are each embodied using a respective suitable digital to analog converter, each adapted for receiving commands as to the respective voltage amounts from the controller 111 over respective busses 117, 119.

For example, where the WRITE STRATEGY requires a change of duration of consecutive optical pulses from pulse duration of fifteen nanoseconds to pulse duration of nine nanoseconds, the controller changes output over the durationbuss 117 from a command FE hexadecimal to a command 98 hexadecimal, so that the digital to analog converter of the generator 113 changes an amount of the analog duration control voltage from one volt to eight tenths of a volt.

Temporal placement is described herein relative to a write clock signal provided at an output 121 of the controller 111. Accordingly, where the WRITE STRATEGY requires a change of temporal placement of consecutive optical pulses from a temporal placement of ten nanoseconds from a corresponding rising edge of the write clock to fifteen nanoseconds, the controller changes output over the placement buss 119 from a command 80 hexadecimal to a command B0 hexadecimal, so that the digital to analog converter of the generator 115 changes an amount of the analog temporal control voltage from one volt to one and two tenths of a volt.

As shown in FIG. 1 a timing generator 123 receives each of the analog duration control voltage and the analog temporal placement control voltage from respective outputs 125, 127 of the respective generators 113, 115. A state output 129 of the timing generator 123 is coupled to the optical pulse generator 103 for determining the respective temporal placement and the respective pulse duration of each pulse in the train of optical pulses.

As will be discussed in greater detail subsequently herein, the timing generator 123 includes an analog duration comparator having a pair of inputs and an output 131, wherein one of the inputs is coupled with the output 125 of the generator 113 of the analog duration control voltage. Also included is a duration control capacitor coupled with another of the inputs. The output 131 of the analog duration comparator of the timing generator is coupled with timing control logic 133. The timing control logic provides an output 135 of a discharge signal coupled with the duration control capacitor for changing charge state thereof based (in part) upon the output of the analog duration comparator.

Similarly, as will be discussed in greater detail subsequently herein, the timing generator 123 includes an analog temporal placement comparator having a pair of inputs and an output 137, wherein one of the inputs is coupled with the output 127 of the generator 115 of the analog temporal placement control voltage. Also included is a temporal placement control capacitor coupled with another of the inputs. The output 137 of the analog temporal placement comparator of the timing generator is coupled with the timing control logic 133. The timing control logic provides an output 139 of a discharge signal coupled with the temporal placement control capacitor for changing charge state thereof based (in part) upon the output of the analog temporal placement comparator.

As will be discussed in greater detail subsequently herein, the timing generator 123 further includes a state device. The state device has a set input coupled with the output of the analog temporal placement comparator. The state device further has a reset input coupled with the output of the analog duration comparator. It is this state device that provides the state output 129 coupled with the optical pulse generator 103 for determining the respective temporal placement and the respective pulse duration of each pulse in the train of optical pulses.

Figure 2A:
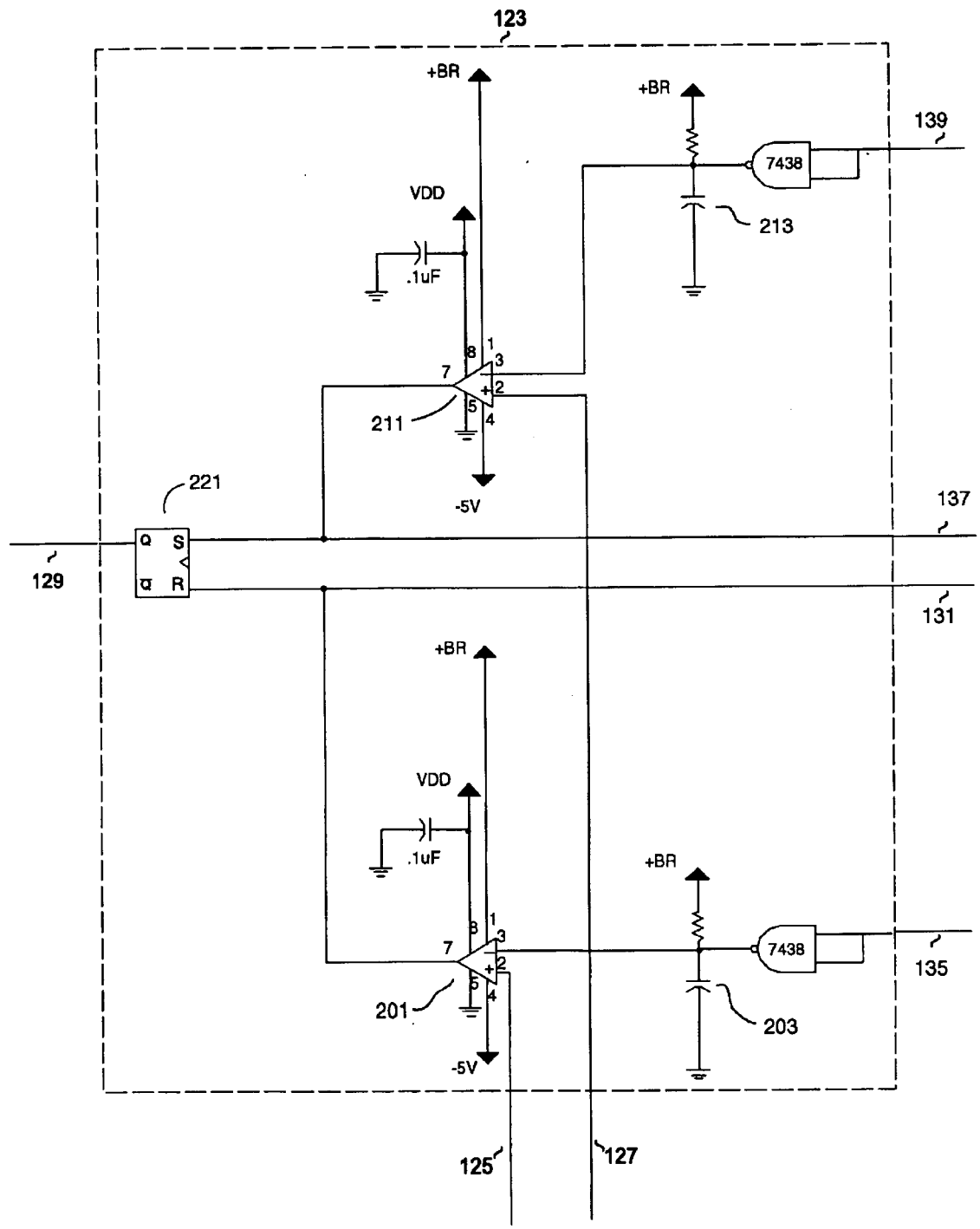
FIG. 2A is a schematic diagram of a preferred embodiment of a timing generator block shown in FIG. 1.

FIG. 2A is a preferred schematic diagram of the timing generator 123 shown in FIG. 1. As shown in FIG. 2A, the timing generator includes the analog duration comparator 201, and the analog temporal placement comparator 211, each suitably biased and each having their respective outputs 131, 137 of the comparators. Appropriate analog comparators for use in the invention include the model LT1720 comparators made by Linear Technology Inc. or suitable equivalents.

As shown in FIG. 2A, the analog duration comparator 201 has a pair of inputs, wherein one of the inputs is coupled with the output 125 of the generator of the analog duration control voltage. Another of the inputs is coupled with the duration control capacitor 203. As shown in FIG. 2A, current is provided through a resistor to charge the duration control capacitor. (Resistance, R, of the resistor, and capacitance, C, of the duration control capacitor 203 are selected based upon a desired product RC time constant thereof being within two to three times a maximum desired charging time of the duration control capacitor. Additionally, in alternative embodiments, a current source may be used in place of the resistor for a beneficial linear effect.) The timing control logic provides output 135 of the discharge signal, which is coupled with the duration control capacitor 203 for changing charge state thereof based (in part) upon the output 131 of the analog duration comparator 201.

Similarly, the analog temporal placement comparator 211 has a pair of inputs, wherein one of the inputs is coupled with the output 127 of the generator of the analog temporal placement control voltage. Another of the inputs is coupled with the placement control capacitor 213. As shown in FIG. 2A, current is provided through another resistor to charge the placement control capacitor. (Resistance, R, of the resistor, and capacitance, C, of the placement control capacitor 213 are selected based upon the desired product RC time constant thereof being within two to three times a maximum desired charging time of the placement control capacitor. Additionally, in alternative embodiments, another current source may be used in place of the resistor for a beneficial linear effect.) The timing control logic provides the output 139 of the discharge signal, which is coupled with the placement control capacitor 213 for changing charge state thereof based (in part) upon the output 137 of the analog temporal placement comparator 211.

As shown in FIG. 2A, the timing generator 123 further includes the state device 221, preferably an SR flip-flop. The set input coupled is with the output 137 of the analog temporal placement comparator 211. The reset input is coupled with the output 131 of the analog duration comparator 201. As discussed previously herein with respect to FIG. 1, the state output 129 of the state device 221 (a non-inverted output of the SR flip-flop) is coupled with the optical pulse generator for determining the respective temporal placement and the respective pulse duration of each pulse in the train of optical pulses.

Figure 2B:
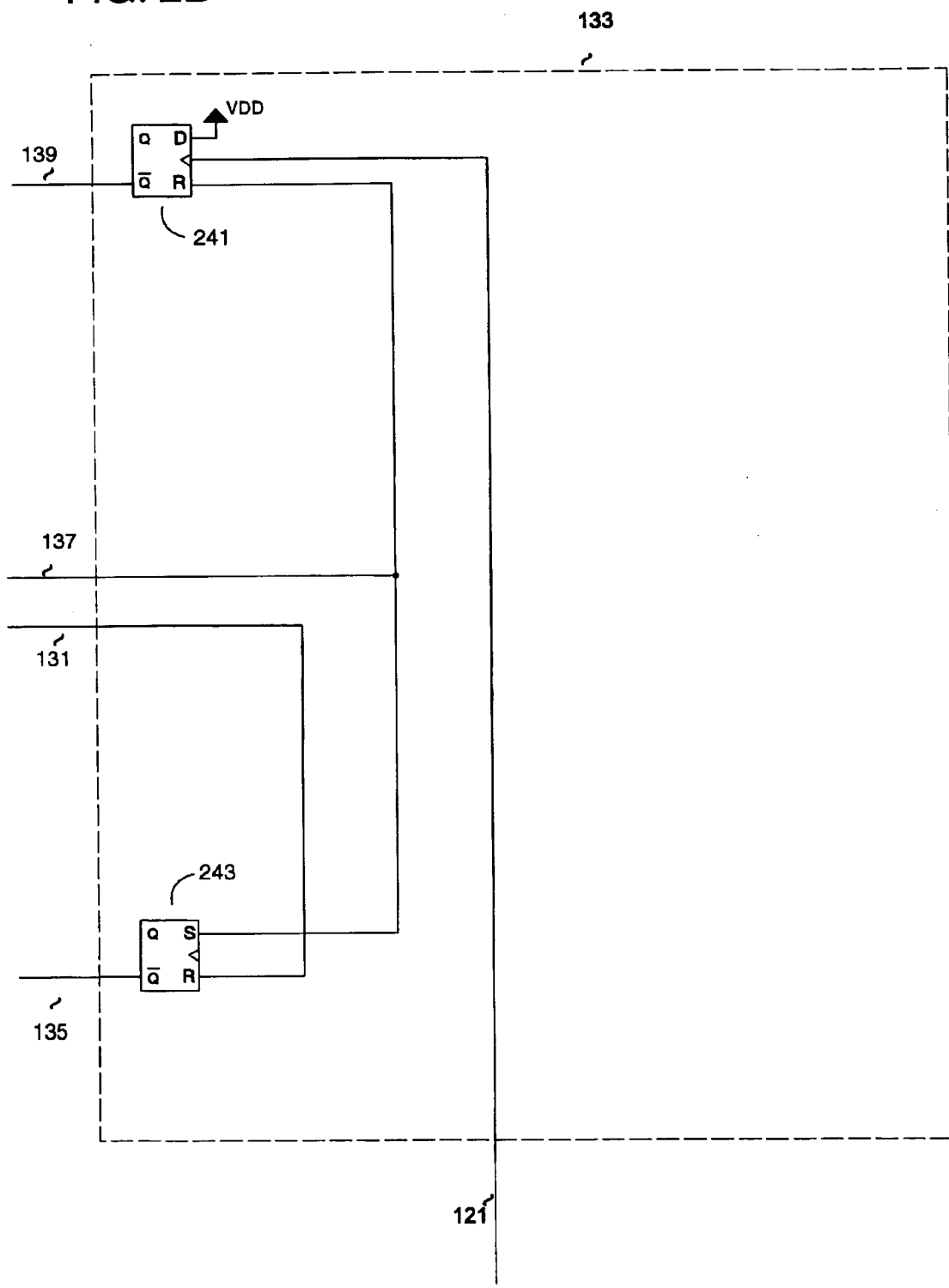
FIG. 2B is a schematic diagram of a preferred embodiment of a timing control logic block shown in FIG. 1.

FIG. 2B is a preferred schematic diagram of the timing control logic 133 shown in FIG. 1. As shown in FIG. 2B, a D flip-flop 241 has a D input tied to a high voltage level (VDD), and further has a clock input coupled with the write clock 121 provided by the controller (as discussed previously herein with respect to FIG. 1.) A reset input of the D flip-flop 241 is coupled with the output 137 of the analog temporal placement comparator. The output 139 discharge signal, coupled with-the placement control capacitor, is provided by the inverted output of the D flip-flop 241.

As further shown in FIG. 2B, an SR flip-flop 243 has a set input coupled with the output 137 of the analog temporal placement comparator. A reset input of the SR flip-flop 243 is coupled with the output 131 of the analog duration comparator 201. The output 135 discharge signal, coupled with the duration control capacitor, is provided by the inverted output of the SR flip-flop 243.

Figure 3:
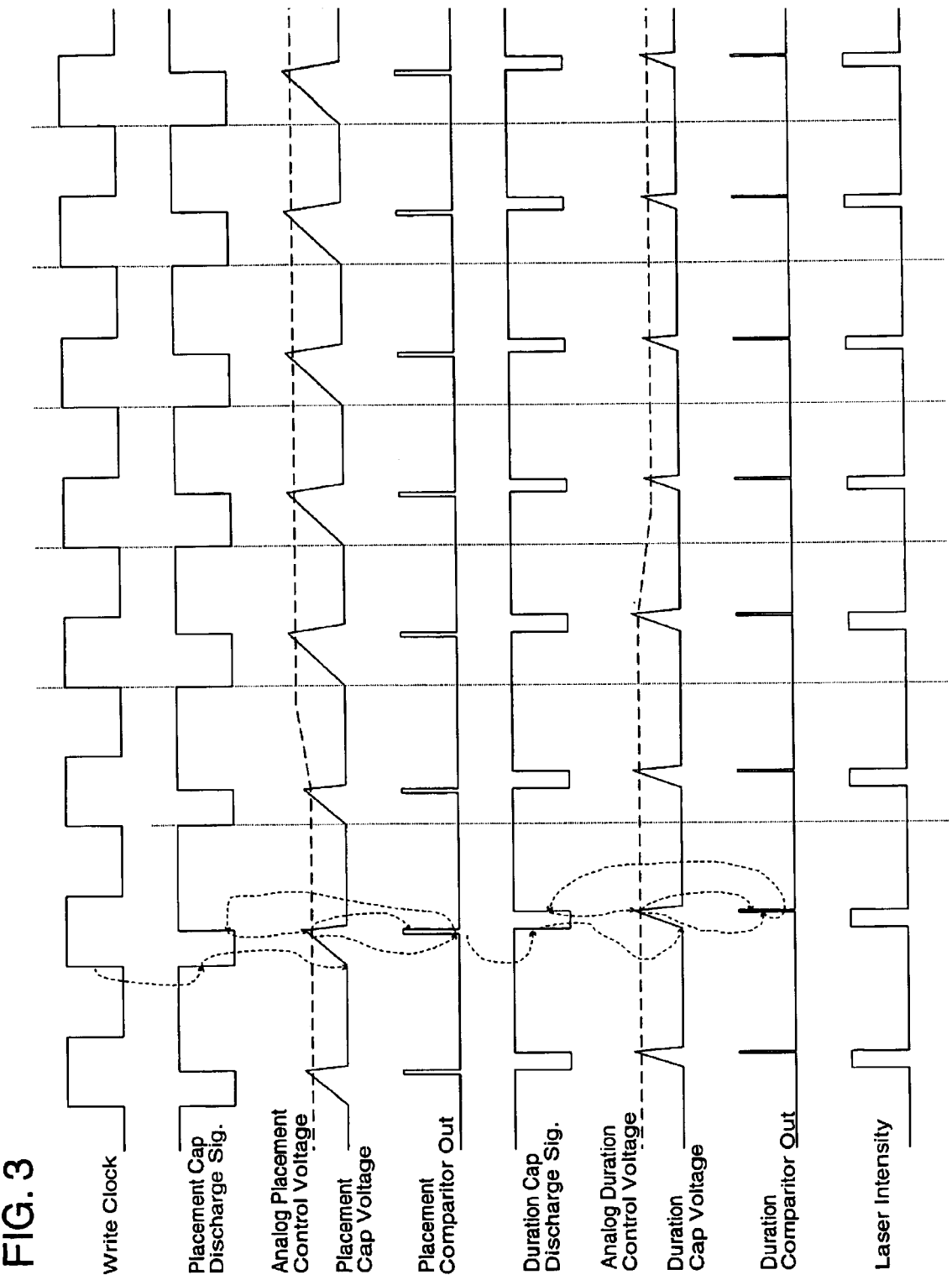
FIG. 3 is a timing diagram illustrating operation of the preferred embodiment of the invention.

FIG. 3 is a timing diagram illustrating operation of the preferred embodiment of the invention. A first trace in FIG. 3 illustrates the write clock. As discussed previously herein with respect to FIGS. 1 and 2B, the write clock is provided by an output 121 of the controller 111.

A second trace in FIG. 3 illustrates the temporal placement control capacitor's discharge signal. As discussed previously herein with respect to FIGS. 1, 2A and 2B, the inverted output of the D flip-flop 241 of the timing control logic 133 provides the discharge signal output 139, which is coupled with the temporal placement control capacitor for changing charge state thereof.

A third trace in FIG. 3 illustrates the analog temporal placement control voltage. As discussed previously herein with respect to FIGS. 1 and 2A, the analog temporal placement control voltage is provided by the output 127 of the analog temporal placement control voltage generator 115.

A fourth trace in FIG. 3 illustrates the voltage of the placement capacitor (wherein the placement capacitor 213 has been discussed previously herein with respect to FIG. 2A) For purposes of ease of visual comparison, in FIG. 3 the third trace showing the analog temporal placement control voltage has been drawn using a dashed line that overlays the fourth trace. A fifth trace shows the output of the analog temporal placement comparator, which is based on the comparison between the voltage of the placement capacitor and the analog temporal placement control voltage.

Operation of the invention with respect to the analog placement control voltage and the output of the analog temporal placement comparator is illustrated using sequential stippled arrows in FIG. 3. In response to the rising edge of the write clock received at the clock input of the D flip-flop of the timing control logic, the inverted output of the D flip-flop provides a falling edge of the placement capacitor discharge signal, as shown in FIG. 3.

In response to the falling edge of the placement capacitor discharge signal, the placement capacitor is released from the hold of the discharge signal, and begins charging, as shown by the ramp of the charging waveform characteristic in FIG. 3.

While the voltage ramps up on the charging placement capacitor, the analog temporal placement comparator continuously compares the voltage of the placement capacitor to the analog temporal placement control voltage. As shown in FIG. 3, the voltage ramp of the charging placement capacitor eventually exceeds the analog temporal placement control voltage, and in response thereto there is a rising edge output by the analog temporal placement comparator.

In response to the rising edge of the output by the analog temporal placement comparator received at the reset input of the D flip-flop of the timing control logic, the inverted output of the D flip-flop provides a rising edge of the placement capacitor discharge signal, as shown in FIG. 3.

In response to the rising edge of the placement capacitor discharge signal, the placement capacitor is under the hold therof, and begins discharging, as shown by the the discharging waveform characteristic in FIG. 3.

While the voltage falls on the discharging placement capacitor, the analog temporal placement comparator continuously compares the voltage of the placement capacitor to the analog temporal placement control voltage. As shown in FIG. 3, the falling voltage of the discharging placement capacitor eventually falls below the analog temporal placement control voltage, and in response thereto there is a falling edge output by the analog temporal placement comparator.

As mentioned previously herein, temporal placement is described herein relative to a write clock. Accordingly, where the WRITE STRATEGY requires a change of temporal placement of consecutive, optical pulses from a temporal placement of ten nanoseconds from a corresponding rising edge of the write clock to fifteen nanoseconds, the controller changes command outputs, so that the digital to analog converter of the generator 115 changes an amount of the analog temporal placement control voltage from one volt to one and two tenths of volts. Such change in the amount of the analog temporal placement control voltage from one volt to the larger one and two tenths volts is illustrated in FIG. 3. As shown, it takes a longer amount of time (five nanoseconds longer) for the voltage of the charging placement capacitor to exceed the larger amount of the changed analog temporal placement control voltage, and in response thereto there is the rising edge output of the analog temporal placement comparator is delayed by the desired five seconds.

The last trace in FIG. 3 shows laser intensity of the generator of the train of optical pulses. As visually illustrated in FIG. 3, the invention provides temporal placement of each optical pulse within the train in accordance with each rising edge of the output of the analog temporal placement comparator, which is variably controlled by the amount of analog temporal placement control voltage.

FIG. 3 further illustrates operation of the invention with respect to the analog duration control voltage and the output of the analog duration comparator. A sixth trace in FIG. 3 illustrates the duration control capacitor's discharge signal. As discussed previously herein with respect to FIGS. 1, 2A and 2B, the inverted output of the SR flip-flop 243 of the timing control logic 133 provides the discharge signal output 135, which is coupled with the duration control capacitor for changing charge state thereof.

A seventh trace in FIG. 3 illustrates the analog duration control voltage. As discussed previously herein with respect to FIGS. 1 and 2A, the analog duration control voltage is provided by the output 125 of the analog duration control voltage generator 113.

An eigth trace in FIG. 3 illustrates the voltage of the duration capacitor (wherein the duration capacitor 203 has been discussed previously herein with respect to FIG. 2A.) For purposes of ease of visual comparison, in FIG. 3 the seventh trace showing the analog duration control voltage has been drawn using a dashed line that overlays the eigth trace. A nineth trace shows the output of the analog duration comparator, which is based on the comparison between-the voltage of the duration capacitor and the analog duration control voltage.

Operation of the invention with respect to the analog duration control voltage and the output of the analog duration comparator is further illustrated using additional sequential stippled arrows in FIG. 3. In response to the rising edge of the output of the analog temporal placement comparator gust discussed), the inverted output of the SR flip-flop provides a falling edge of the duration capacitor discharge signal, as shown in FIG. 3.

In response to the falling edge of the duration capacitor discharge signal, the duration capacitor is released for the hold of the discharge signal, and begins charging, as shown by the ramp of the charging waveform characteristic in FIG. 3.

While the voltage ramps up on the charging duration capacitor, the analog duration comparator continuously compares the voltage of the duration capacitor to the analog duration control voltage. As shown in FIG. 3, the voltage ramp of the charging duration capacitor eventually exceeds the analog duration control voltage, and in response thereto there is a rising edge output by the analog duration comparator.

In response to the rising edge of the output by the analog duration comparator received at the reset input of the SR flip-flop of the timing control logic, the inverted output of the SR flip-flop provides a rising edge of the duration capacitor discharge signal, as shown in FIG. 3.

In response to the rising edge of the duration capacitor discharge signal, the duration capacitor is under the hold therof, and begins discharging, as shown by the the discharging waveform characteristic in FIG. 3.

While the voltage falls on the discharging duration capacitor, the analog duration comparator continuously compares the voltage of the duration capacitor to the analog duration control voltage. As shown in FIG. 3, the falling voltage of the discharging duration capacitor eventually falls below the analog duration control voltage, and in response thereto there is a falling edge output by the analog duration comparator.

As mentioned previously herein, where the WRITE STRATEGY requires a change of duration of consecutive optical pulses, for example from the duration of fifteen nanoseconds to the duration of nine seconds, the controller changes command outputs, so that the digital to analog converter of the generator 113 changes an amount of the analog duration control voltage from one volt to eight tenths of a volt.

Such change in the amount of the analog duration control voltage from one volt to the smaller eight tenths of a volt is illustrated in FIG. 3. As shown, it takes a shorter amount of time (six nanoseconds less) for the voltage of the charging duration capacitor to exceed the smaller amount of the changed analog duration control voltage, and in response thereto there is the rising edge output of the analog duration comparator is hastened by the desired six seconds.

The last trace in FIG. 3 shows laser intensity of the generator of the train of optical pulses. As visually illustrated in FIG. 3, the invention provides duration of each optical pulse within the train limited in accordance with each rising edge of the output of the analog temporal placement comparator, which is variably controlled by the amount of the analog duration control voltage.

As discussed, the invention advantageously provides a relatively simple apparatus and method for flexibly and precisely varying temporal placement and duration of pulses, within a train of high speed, high power optical pulses. Although. specific embodiments of the invention have been described and illustrated, the invention is not to be limited to the specific forms or arrangements of parts so described and illustrated, and various modifications and changes can be made without departing from the scope and spirit of the invention. Within the scope of the appended claims, therefore, the invention may be practiced other wise than as specifically described and illustrated.

What is claimed is:

1. An apparatus comprising:
   optics adapted for focusing on a layer of an information storage media;
   a symmetrical optical pulse generator, coupled with the layer through the optics, for generating a train of optical pulses, wherein each pulse is substantially symmetrical and has a respective temporal placement within the train and has a respective pulse duration;
   a generator of an analog duration control voltage having a variable voltage amount, coupled with the optical pulse generator for varying the respective pulse duration of each substantially symmetrical pulse in accordance with the variable voltage amount.

2. An apparatus as in 1 further comprising a controller coupled with the generator for variably controlling the variable voltage amount, and in turn the respective pulse duration, in accordance with a WRITE STRATEGY that is based on a physical property of the layer of the information storage media.

3. An apparatus as in 1 further comprising a generator of an analog temporal placement control voltage having a variable voltage amount, coupled with the optical pulse generator for varying the respective temporal placement of each pulse in accordance with the variable voltage amount of the analog temporal placement control voltage.

4. An apparatus as in 3 further comprising a controller coupled with the generator for variably controlling the amount of the analog temporal placement control voltage, and in turn the respective temporal placement, in accordance with a WRITE STRATEGY that is based on a physical property of the layer of the information storage media.

5. An apparatus as in 1 wherein the apparatus includes an analog duration comparator having a pair of inputs and an output, wherein one of the inputs is coupled with the generator of the analog duration control voltage.

6. An apparatus as in 5 further comprising a duration control capacitor coupled with another of the inputs.

7. An apparatus as in 6 further comprising timing control logic coupled with the output of the analog duration comparator, and further coupled with the duration control capacitor for changing a charge state thereof based upon the output of the analog duration comparator.

8. An apparatus as in 3 wherein the apparatus includes an analog temporal placement comparator having a pair of inputs and an output, wherein one of the inputs is coupled with the generator of the analog temporal placement control voltage.

9. An apparatus as in 8 further comprising a temporal placement control capacitor coupled with another of the inputs.

10. An apparatus as in 9 further comprising timing control logic coupled with the output of the analog temporal placement comparator, and further coupled with the temporal placement control capacitor for changing a charge state thereof based upon the output of the analog temporal placement comparator.

11. An apparatus as in 3 further comprising:
    an analog duration comparator having a pair of inputs and an output, wherein one of the inputs is coupled with the generator of the analog duration control voltage;
    an analog temporal placement comparator having a pair of inputs and an output, wherein one of the inputs is coupled with the generator of the analog temporal placement control voltage; and
    a state device having: a set input coupled with the output of the analog temporal placement comparator; a reset input coupled with the output of the analog duration comparator; and a state output coupled with the optical pulse generator for determining the respective temporal placement and the respective pulse duration of each pulse in the train of optical pulses.

12. A method comprising:
    providing optics adapted for focusing on a layer of an information storage media and a symmetrical optical pulse generator, coupled with the layer through the optics;
    generating a train of optical pulses, wherein each pulse is substantially symmetrical and has a respective temporal placement within the train and has a respective pulse duration;
    generating an analog duration control voltage having a variable voltage amount for varying the respective pulse duration of each substantially symmetrical pulse in accordance with the variable voltage amount.

13. A method as in 12 further comprising controlling the variable voltage amount, and in turn the respective pulse duration, in accordance with a WRITE STRATEGY that is based on a physical property of the layer of the information storage media.

14. A method as in 12 further comprising generating an analog temporal placement control voltage having a variable voltage amount, coupled with the optical pulse generator for varying the respective temporal placement of each pulse in accordance with the amount of the analog temporal placement control voltage.

15. A method as in 14 further comprising controlling the amount of the analog temporal placement control voltage, and in turn the respective temporal placement, in accordance with a WRITE STRATEGY that is based on a physical property of the layer of the information storage media.

* * * * *